US011228500B2

(12) United States Patent
Prabhu et al.

(10) Patent No.: US 11,228,500 B2
(45) Date of Patent: Jan. 18, 2022

(54) TOOL FOR NETWORK PERFORMANCE DESIGN AND CONFIGURATION

(71) Applicant: Cisco Technology, Inc., San Jose, CA (US)

(72) Inventors: Vinay Prabhu, Milpitas, CA (US); Sarah Adelaide Evans, San Jose, CA (US); Jigar Dinesh Parekh, Fremont, CA (US); Suraj Rangaswamy, San Jose, CA (US); Parth Sanjiv Doshi, San Jose, CA (US); Pranav Narasimmaraj, Pleasanton, CA (US); Ashish Shendure, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 16/424,776

(22) Filed: May 29, 2019

(65) Prior Publication Data

US 2020/0382381 A1    Dec. 3, 2020

(51) Int. Cl.
*H04L 12/24* (2006.01)

(52) U.S. Cl.
CPC .......... *H04L 41/142* (2013.01); *H04L 41/083* (2013.01); *H04L 41/0836* (2013.01); *H04L 41/145* (2013.01)

(58) Field of Classification Search
CPC . H04L 41/142; H04L 41/083; H04L 41/0836; H04L 41/145
See application file for complete search history.

(56) References Cited

U.S. PATENT DOCUMENTS

| 9,087,319 | B2* | 7/2015 | Nguyen | ................... H04L 12/14 |
| 10,404,613 | B1* | 9/2019 | Brooker | ................... H04L 47/70 |
| 2013/0055091 | A1* | 2/2013 | Dutta | .................. G06F 3/04842 715/736 |
| 2016/0350683 | A1* | 12/2016 | Bester | ..................... H04L 49/20 |
| 2017/0318083 | A1* | 11/2017 | Ignatyev | ............. H04L 67/1023 |

* cited by examiner

*Primary Examiner* — Austin J Moreau
(74) *Attorney, Agent, or Firm* — Polsinelli PC (57) ABSTRACT

Systems, methods, and computer-readable media for designing network performance and configuration include determining one or more use cases for a network to be provisioned, based on at least one or more business verticals related to a customer of the network. A data plane scale is determined from the use cases and an initial data plane scale generated using a linear regression on one or more data plane parameters. The data plane parameters include a platform type, feature set, packet size, or software version of the network. A control plane scale is determined from the use cases and an initial control plane scale generated using a linear regression on one or more control plane parameters of the network. The control plane parameters include a platform type, feature set, or software version of the network. The network is provisioned for the data plane scale and the control plane scale.

20 Claims, 7 Drawing Sheets

TOOL FOR NETWORK PERFORMANCE DESIGN AND CONFIGURATION

TECHNICAL FIELD

The subject matter of this disclosure relates in general to the field of computer networking, and more particularly to designing network hardware resource based on performance considerations.

BACKGROUND

Currently, hardware resources for network hardware are allocated in a substantially manual process, based for example, on the analysis and recommendation of a network architect. The network design architect may utilize basic benchmarking numbers, personal experience, and other static parameters which may be available in provisioning the hardware resources. At the time of provisioning, the hardware resources may be allocated with a goal of meeting performance requirements of different platforms with various feature sets enabled.

There are many platforms available for modern networks, each platform with a corresponding multivariate performance function that is defined by the following input variables: platform type, optional hardware enhancements, features enabled, number of connected circuits, and traffic characteristics. It is difficult for a network architect to optimally assign resources without a full-fledged model of the performance of a platform under specific conditions.

In addition to manual provisioning by network architects, sizing tools are also known in the art which can provision network hardware based on the benchmarking numbers and static parameters. However, network design (manual and/or using existing sizing tools) do not take into account the configuration knobs and policies which impact a network's utilization.

Thus, conventional network designs can lead to under-provisioning or over-provisioning of hardware resources. Moreover, the conventional network design techniques do not account for hardware availability. It is possible that particular hardware flavors a network architect or conventional design tool may wish to incorporate in a network may be unavailable or be on backorder when a customer order is placed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In some examples, techniques and systems are described for provisioning a network based on business specific needs or customer intent. In some examples, information about the kinds and quantity of traffic that will be flowing through each site in a network (e.g., a software-defined wide-area network (SD-WAN)) is collected and/or inferred and a control plane scale is calculated and for each site. Platforms that may be able to meet the calculated control plane scale may be determined based on redundancy models of the network mapped to circuits. Platforms that may be unable to meet the calculated control plane scale can be eliminated from consideration. Based on information about the traffic characteristics in a given site, a related business vertical and a precomputed performance model based on the features deployed for the site, projected performance of remaining platforms can be calculated. The precomputed performance model and performance of remaining platforms are used to determine a set of recommendations for the site, wherein each recommendation in the set is optimized for a different headroom threshold, with the headroom thresholds including parameters such as performance, geolocation, convergence and redundancy.

According to some examples, systems, methods, and computer-readable media for designing network performance and configuration include determining one or more use cases for a network to be provisioned, based on at least one or more business verticals related to a customer of the network. A data plane scale is determined from the use cases and an initial data plane scale generated using a linear regression on one or more data plane parameters. The data plane parameters include a platform type, feature set, packet size, or software version of the network. A control plane scale is determined from the use cases and an initial control plane scale generated using a linear regression on one or more control plane parameters of the network. The control plane parameters include a platform type, feature set, or software version of the network. The network is provisioned for the data plane scale and the control plane scale.

In some examples, a method is disclosed. The method can include determining one or more use cases for a network to be provisioned, based on at least one or more business verticals related to a customer of the network. The method can further include determining, from the one or more use cases and an initial data plane scale, a data plane scale for the network and determining, from the one or more use cases and an initial control plane scale, a control plane scale for the network. The method can further include provisioning the network for the data plane scale and the control plane scale.

In some examples, a system is disclosed. The system can include one or more processors, and at least one computer-readable storage medium having stored therein instructions which, when executed by the one or more processors, cause the system to: determine one or more use cases for a network to be provisioned, based on at least one or more business verticals related to a customer of the network; determine, from the one or more use cases and an initial data plane scale, a data plane scale for the network; determine, from the one or more use cases and an initial control plane scale, a control plane scale for the network; and provision the network for the data plane scale and the control plane scale.

In some examples, a non-transitory computer-readable storage medium is disclosed. The non-transitory computer-readable storage medium can include instructions stored therein instructions which, when executed by one or more processors, cause the one or more processors to: determine one or more use cases for a network to be provisioned, based on at least one or more business verticals related to a customer of the network; determine, from the one or more use cases and an initial data plane scale, a data plane scale for the network; determine, from the one or more use cases and an initial control plane scale, a control plane scale for the network; and provision the network for the data plane scale and the control plane scale.

In some examples, the methods, systems, and non-transitory computer-readable storage medium described above further comprise generating the initial data plane scale based on performing a linear regression on one or more data plane parameters of the network, the one or more data plane parameters comprising one or more of a platform type, feature set, packet size, or software version of the network.

In some examples, the methods, systems, and non-transitory computer-readable storage medium described above further comprise generating the initial control plane scale based on performing a linear regression on one or more control plane parameters of the network, the one or more control plane parameters comprising one or more of a platform type, feature set, or software version of the network.

In some examples, of the methods, systems, and non-transitory computer-readable storage medium described above, determining the one or more use cases based at least on the one or more business verticals comprises mapping the one or more business verticals to one or more of factors related to the network, the one or more factors comprising one or more of an average mix of packet size, a common feature set, or a variance in bandwidth.

In some examples, of the methods, systems, and non-transitory computer-readable storage medium described above, the mapping comprises clustering algorithms on the one or more factors to determine clusters related to the use cases.

In some examples, the methods, systems, and non-transitory computer-readable storage medium described above further comprise determining the one or more use cases from information received from the customer, the information comprising one or more of a number and type of circuits available for the network, a topology of the network, or an estimated total bandwidth usage for each site of the network.

In some examples of the methods, systems, and non-transitory computer-readable storage medium described above, the data plane scale comprises one or more of a price, inventory, or configured reliability for the data plane of the network.

In some examples of the methods, systems, and non-transitory computer-readable storage medium described above, the control plane scale comprises one or more of a price, performance, or configured reliability for the control plane of the network.

DESCRIPTION OF EXAMPLE EMBODIMENTS

Disclosed herein are systems, methods, and computer-readable media for schemes according to which recommendations may be automatically generated for hardware provisioning in networks. In example aspects, customer preferences, needs, or intent are obtained in terms of factors such as desired redundancy, cost, geolocation of data centers, etc. Based on the customer's intent, for example, objective functions are used to determine optimized policy and configuration of network hardware which best suit the customer's intent. The optimized policy and configuration are used to generate a performance model and platform recommendations for the customer.

As previously explained, conventional tools for hardware resource allocation do not take intent or customer specific needs into account when estimating sizing or scaling needs for the network. For instance, the conventional tools may consider a perceived scale as input and assign a platform based on the perceived scale and using a table of performance metrics generated by test cases. Thus in the conventional tools, determining the platform is treated as a knapsack or best-fit problem which does not optimize for intent. For instance, the conventional tools may use the perceived scale and standard benchmarks as inputs to the knapsack and determine a platform recommendation based on the best fit. The drawbacks of this approach include a tendency to over-provision and propagate inflated scaling estimates that are the result of inefficient policy or configuration. Thus, network hardware and cloud services (e.g., network controllers) provisioned as a result of using such conventional tools tend to be underutilized and a significant portion of resources in data centers designed according to such models may remain unused or underutilized.

Example aspects of this disclosure overcome the drawbacks of the conventional tools by first determining an intent of a customer for whom a network or hardware resource is to be provisioned. Examples of hardware resources to be provisioned for a software defined wide area network (SD-WAN) include data center sites, data center redundancies, control connections per transport location (tloc), routers, etc. In some examples, a customer intent (e.g., for an SD-WAN to be provisioned) can include factors such as expected redundancy, expected performance, and expected cost. In some examples, additional factors which may be used to determine customer intent can include expected feature sets, packet mix, type of topology, geolocations or number of different data centers, etc. In some examples, the customer intent is determined based on values or ranges assigned to these factors (e.g., a customer intent may include the following values assigned to the above factors: redundancy: "high", performance: "high", and cost: "medium"). As will be described in further detail below, example aspects of this disclosure include systems and techniques for utilizing the customer intent and automatically generating configuration, policy, and platform recommendations for the hardware resources to be provisioned. In example aspects, the hardware provisioned using the intent-based approach can significantly reduce the target scale while providing the expected redundancy. Thus hardware, controller counts, etc., can be significantly reduced, resulting in corresponding cost savings.

Figure 1:
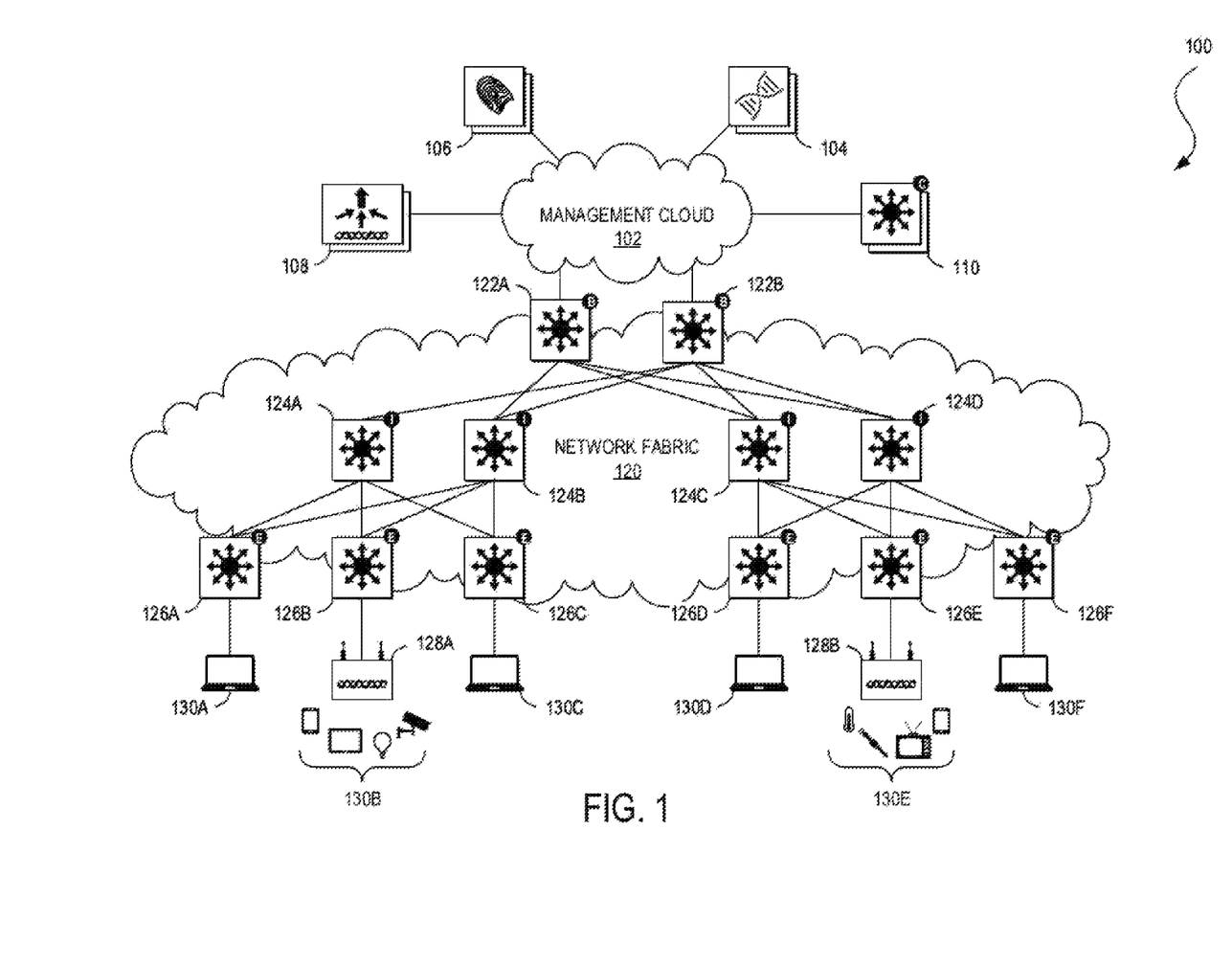
FIG. 1 illustrates an example of a physical topology of an enterprise network in accordance with some examples.

FIG. 1 illustrates an example of a physical topology of an enterprise network 100 which may be configured according to aspects of this disclosure. For example, the enterprise network 100 may include a wired network whose resources may be provisioned according to example techniques herein. In one example, the enterprise network 100 may provide intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
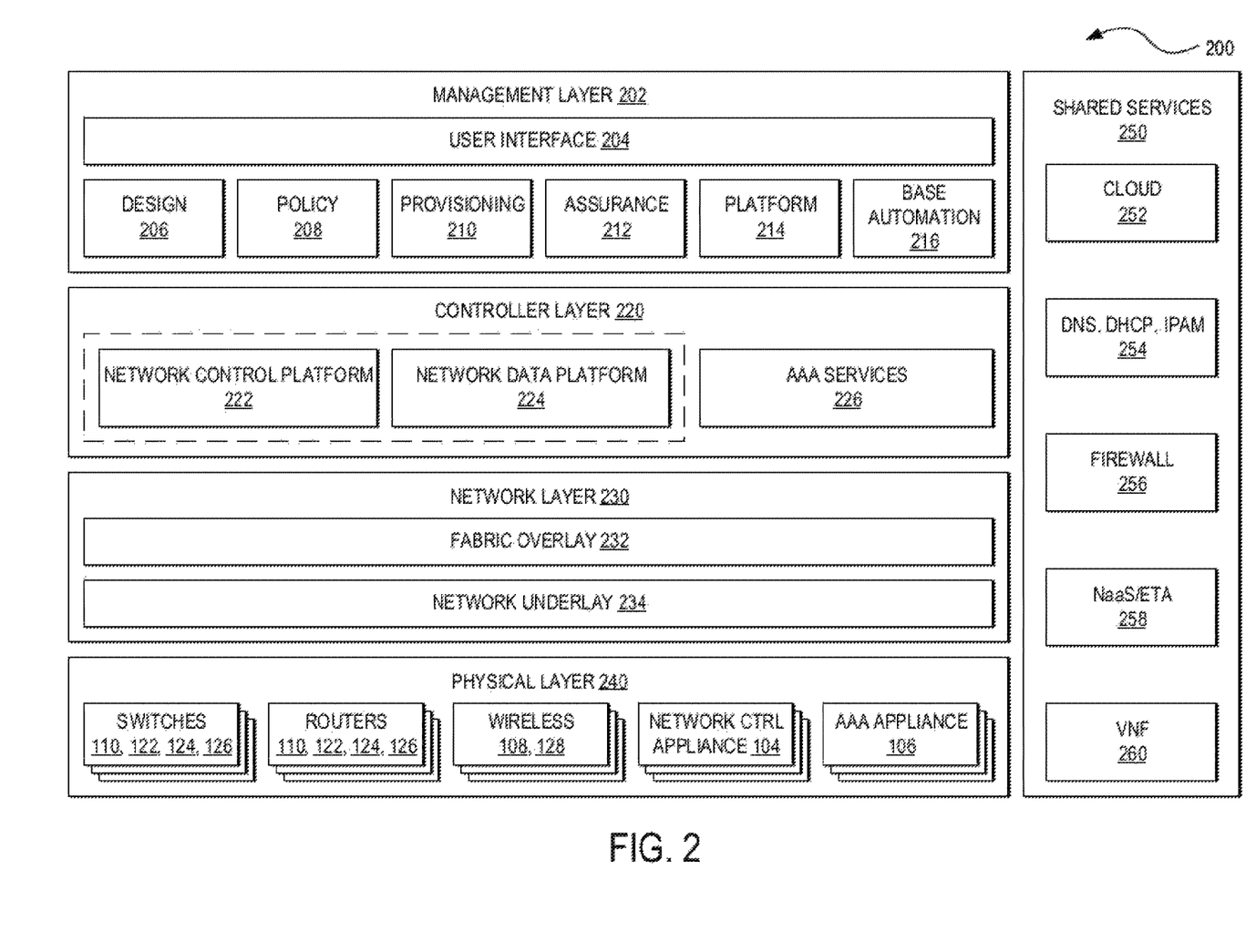
FIG. 2 illustrates an example of a logical architecture for an enterprise network in accordance with some examples.

FIG. 2 illustrates an example of a logical architecture 200 for an enterprise network (e.g., the enterprise network 100) which may be created based on customer intent, according to example aspects of this disclosure. One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

In some examples, the management layer 202 can abstract the complexities and dependencies of other layers of the logical architecture 200 and provide a user with tools and workflows to manage a network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include example intent-based design tools which may be used for designing and managing workflows, site profiles, maps and floor plans, network settings, and IP address management, among others. The policy functions 208 can include related tools and workflows for defining and managing network policies. The provisioning functions 210 can include related tools and workflows for deploying the network designed according to the design functions 206 and the policy functions 208. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

In an illustrative example, a customer's business vertical can include banking. For this business vertical, the customer may desire a network with 6,000 sites with either two or three circuits such as transport locations (tlocs) per site. More specifically, among the 6,000 sites, 4,500 sites may include two tlocs each and 1,500 sites may include three tlocs each, providing an average of 2.25 tlocs per site. For this network, both data plane redundancy and control plane redundancy would need to be accounted for to ensure throughput and performance expectations. If the customer used a conventional sizing tool for this network or relied on a network architect, a base line assumption for data center redundancy may be estimated as two data centers for which network controllers (e.g., vSmarts) would be needed, and a device redundancy may be estimated as two control connections per tloc. A step-wise approach is then followed to determine the total number of control connections. In a first step, the number of tlocs in a network designed with these estimates would be estimated as 6,000 sites*2.25 tlocs per site, which is 13,500 tlocs. In a second step, the number of control connections is determined by multiplying the number of tlocs by two, since two control connections are needed per tloc, which would result in 13,500 tlocs*2 control connections per tloc, resulting in 27,000 control connections across the 6,000 sites. To provisions 27,000 connections, 20 controllers such as vSmarts may be sufficient, but given the estimated data center redundancy of two data centers per controller, the number of controllers needed for this network would be estimated as 40 vSmart controllers. However, this network designed for 27,000 connections and 40 vSmart controllers can be a significant over-provisioning for the network, because in practical use cases, the network may at best be utilized at a 25% capacity for actual traffic.

In example aspects of this disclosure, the network can be designed with an objective function calculated for the customer's needs in a manner which can result in the network being provisioned with redundancy/scale which is sufficient to meet the expected throughput and performance of the network. For example, according to aspects of this disclosure, the customer's intent can be obtained based on information which is related to the business vertical, as well as the specific expectations for the network being designed. For example, the customer's intent can be calculated in terms of factors such as redundancy, performance, and cost. In the illustrative example mentioned above where the customer's business vertical for the network is banking, the redundancy can be calculated to have a "high" score, performance can be calculated as having a "high" score, and cost can be calculated as having a "medium" score. The network can then be provisioned to meet the scores calculated for each of the factors above. In the previously described example, by using the example techniques herein, the scale can be calculated as being half of that estimated by the conventional sizing tools, i.e., only 13,500 control connections, rather than the conventionally estimated 27,000 control connections. The scale reduction can be achieved based on utilizing configuration knobs according to this disclosure.

In more detail, while the conventional sizing tool described above calculated the data center redundancy and the device redundancy in a step-wise approach, the example technique the data center redundancy and device redundancy are accounted for in a unified manner based on knowing the customer's intent. In one example aspect, for the customer's intent determined to include the "high" redundancy, "high" performance, and "medium" cost, the data center and device redundancy expectations can be met by provisioning each tloc to connect to only one controller (i.e., a single control connection per tloc), but the one controller that a tloc would connect to would be located in a different data center from the data center in which the tloc is located. Thus, each tloc in each data center connects to a controller in another data center, for both data centers being provisioned. This would result in a single step calculation of the total number of control connections as 6000 sites*2.25 tlocs per site*1 control connection per tloc=13,500 control connections (as opposed to the 27,000 control connections estimated by conventional techniques). Further, only 10 controllers such as vSmarts are needed for 13,500 control connections, so the number of controllers is also reduced. Additionally, since the controllers have already been provisioned across the two data centers with tloc connections being made across the two data centers, data center redundancy has already been achieved, thus avoiding the need to have the number of controllers doubled as in conventional techniques. Thus, the number of controllers in example aspects is only 10 controllers, as opposed to the 40 controllers estimated by the conventional techniques. The reduction in the number of control connections and the number of controllers leads to significant cost and resource savings in example aspects of this disclosure. The following description provides additional details for the example systems and techniques of this disclosure.

In some examples, information about the kinds and quantity of traffic that will be flowing through each site in a customer's network to be designed can be obtained in an initial step of a process of network design. For example, the traffic can be determined based on customer input on number of flows expected per minute, details on specific hosted applications, and expected throughput. In some examples, if such traffic information is not available from the customer, a statistical model such as a median throughput and number of flows per minute based on existing customer data can be used as alternatives. The statistical information for the customer data can be based on the business vertical pertaining to the customer (e.g., whether the network deployment is for healthcare, banking, etc.). An application list of popular applications used by existing customers in the business vertical can also be compiled if specific hosted application information from the customer is unavailable.

An initial performance model based on the features to be deployed is also generated. A performance model can be pre-computed for each platform type or optional hardware enhancements using linear regression on existing benchmark data with the following input variables: features enabled, throughput, and packet size. In some examples, the pre-computed performance model can be calculated for each platform using a weighted average of performance numbers generated using the statistical information such as the application list, average packet size from historical data, etc., for the business vertical.

In the case of network deployments such as for SD-WAN, control plane scale is calculated for each customer site where the hardware is to be deployed. Platforms which can meet these scale requirements are determined based on the redundancy models mapped to circuits, convergence and location. Platforms which may not be able to meet these scale requirements are eliminated from consideration eliminate any platforms that are not able to meet those scale requirements.

In some examples, the customer's business vertical is considered. Initially, a customer use model is developed which maps the business vertical to factors such as an average mix of packet size, a common feature set, and variance in bandwidth usage (e.g., height of bandwidth peaks).

In an example, the customer's business vertical, the information about the traffic characteristics in a given site, and the initial performance model are used to generate projected performance of remaining platforms for the customer's network. Based on the projected performance, recommendations can be generated, wherein the recommendations may be tailored for different headroom thresholds for different factors such as performance, throughput, geolocation, convergence, redundancy, etc. For example, recommendations for the headroom thresholds for throughput can provided in terms of a base value which can be increased by a minimum (e.g., 10%), recommended (e.g., 30%) or a best case (e.g., 50%) for a particular network. In some examples, the hardware resources can be provisioned based on the headroom thresholds for throughput. For instance, using a knapsack or best-fit approach, an iterative algorithm can be used to determine optimal hardware for each of the headroom thresholds which are recommend (e.g., the minimum, recommended, and best case, in the above example).

Figure 3:
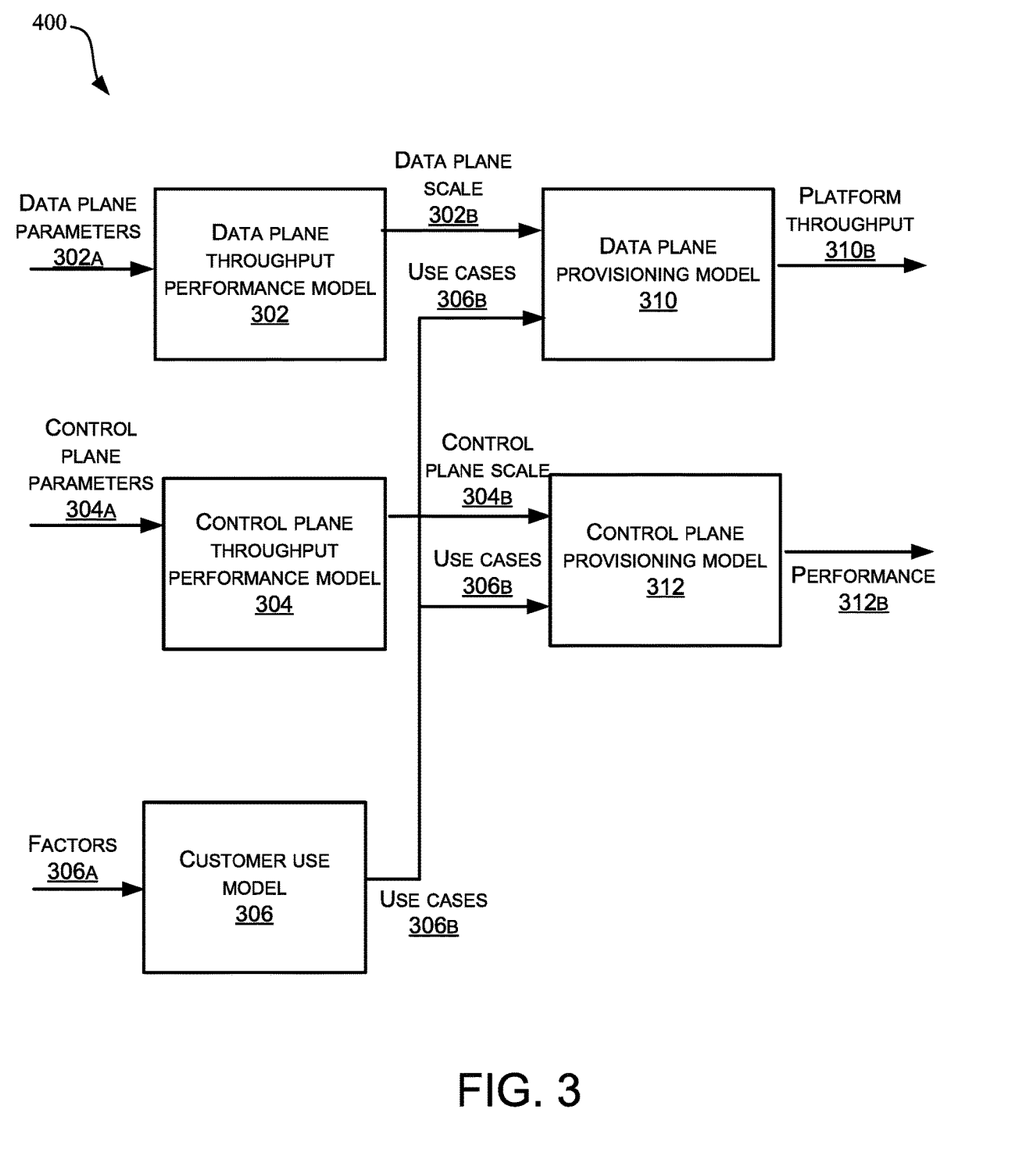
FIG. 3 illustrates a block diagram of a system for designing a network to be provisioned in accordance with some examples.

FIG. 3 illustrates an example system 300 configured to design a network such as an SD-WAN (e.g., the enterprise network 100). Aspects of the system 300 may be implemented by the design functions 206 of the logical architecture 200. Among various components of the system 300, a data plane throughput performance model 302, a control plane throughput performance model 304, a customer use model 306, a data plane provisioning model 310, and a control plane provisioning model 312 are illustrated as functional blocks. These functional blocks can be implemented using computer-executable instructions that are stored or otherwise available from computer readable media in some examples.

The data plane throughput performance model 302 can include a functional block configured to compute an initial data plane scale 302B for a network to be provisioned. The data plane throughput performance model 302 can utilize one or more data plane parameters 302A which may be known or calculated for the network. In some examples, the data plane parameters 302A can be determined based on performing linear regression on existing benchmark data pertaining to platform type, feature set, packet size, or software version. In some examples, resource allocation between a data plane and a control plane of the network may be based on the software version used. In some examples, the data plane throughput performance model 302 can implement algorithms such as multiple linear regressions on the data plane parameters 302A to determine an initial output, data plane scale 302B, which can be subsequently used for estimating throughput of all platforms, or scale for the network. In some examples, the multiple linear regressions can involve ridge regularization for preventing overfitting of the parameters 302A.

The control plane throughput performance model 304 can include a functional block configured to determine an initial control plane scale 304B based on one or more control plane parameters 304A. The control plane parameters 304A can include the platform type, feature set, packet size, software version, etc., (some of which can be similar to or common to the data plane parameters 302A). In addition to or in lieu of platform type, the control plane parameters 304A can also include cloud environment or virtual machine size for the network. In some examples, resource allocation between a data plane and a control plane of the network may be based on the software version used. In some examples, the control plane throughput performance model 304 can implement algorithms such as multiple linear regressions on the control plane parameters 304A to determine the initial output, control plane scale 304B. The control plane scale 304B can be subsequently used to determine performance or control scale for the network to be provisioned.

According to example aspects of this disclosure, one or more of the data plane parameters 302A which are input to the data plane throughput performance model 302 and one or more of the control plane parameters 304A which are input to the control plane throughput performance model 304 can be augmented based on customer intent.

The customer use model 306 can include a functional block configured to determine customer intent in the form of use cases 306B. In some examples, the customer use model 306 can include a functional block configured to generate a model of customer use for the network infrastructure being designed. In some examples, one or more factors 306A can be used to determine the customer's needs and intent. In some examples, the one or more factors 306A can include information regarding the business vertical of the customer (e.g., whether the business may relate to healthcare, banking, e-commerce, etc.). For example, based on the business vertical, an estimate of a number of sites, traffic mix, average mix of packet size, a common feature set for different applications, variance in bandwidth usage (e.g., height of bandwidth peaks), etc., can be obtained. For example, the business vertical can be used to infer packet heavy features among other options, ability for deep packet inspection, network protocol (e.g., netflow), network options to include intrusion detection systems (IDS) and/or intrusion prevention systems (IPS), which may be common to the business vertical or based on statistical knowledge, benchmarking data, etc., for the business vertical.

In some examples, the customer use model 306 can utilize exploratory clustering algorithms (e.g., Support Vector Machine (SVM)) to determine one or more use cases 306B based on the business verticals. In some examples, the customer use model 306 can be configured to identify or highlight differences in resource consumption or usage for different business verticals. In some examples, the use cases 306B can be generated from the clusters, e.g., based on an average traffic mix and features that are enabled on more than half of the observations in a cluster. In some examples, clusters in the values can be identified and the clusters can be interpreted and presented as configurable options such that the customer may select the options best suited for the business needs or intent.

In some examples, in addition to the business verticals, the one or more factors 306A input to the customer use model 306 can also include information which may be received from the customer. In some examples, the information can include a minimal information set which would provide an indication of the customer's needs or intent as it relates to the network being provisioned. In some examples, the minimal information set can include one or more of the following: network size in terms of a number and type of circuits the customer intends to implement, the nature of the network sites (e.g., sites such as data centers can include a mix of private and public circuits); a network topology for the sites (e.g., full-mesh, hub-spoke, hybrid, etc.); and an estimated total bandwidth usage for each network site.

The data plane provisioning model 310 can include a functional block configured to determine data plane scale in the form of platform throughput 310B. The platform throughput 310B can be based on the data plane scale 302B from the data plane throughput performance model 302 and the use cases 306B from the customer use model 306. In some examples, the data plane provisioning model 310 can utilize a pre-computed or initial performance model such as the initial data plane scale 310B and augment the initial data plane scale 310B based on the customer's intent or needs derived from the use cases 306B. In some examples, the data plane provisioning model 310 can implement a knap sack algorithm for each site to determine the platform throughput 310B, based on the data plane scale 302B and the use cases 306B. In some examples, the knap sack problem can use a function such as a cost of a router+x(availability) in determining costs, wherein x is a configurable weight. The platform throughput 310B can correspond to a minimum total objective throughput for the site to solve for using the knap sack problem.

The control plane provisioning model 312 can include a functional block configured to determine control plane scale in the form of performance 312B. The performance 312B can correspond to the scale of expected performance for all clouds/virtual machines to be implemented in the network, for example. The performance 312B can be determined by the control plane provisioning model 312 based on the control plane scale 304B from the control plane throughput performance model 304 and the use cases 306B from the customer use model 306. In some examples, the control plane provisioning model 312 can also implement a knap sack algorithm to determine the expected performance 312B from the control plane scale 304B and the use cases 306B. In some examples, the knap sack problem can use a function wherein cost may correspond to real monetary cost and a lower bound objective can be the computed control scale or expected performance.

In example aspects of the system 300, the data plane scale and the control plane scale determined respectively from the platform throughput 310B and the performance 312B can be used for recommendations of different headroom thresholds for the network. In addition to throughput and performance, geolocation, convergence, and redundancy estimates can also be generated. In some examples, the recommendations can be generated in terms of a suggested number of management tools, routers, circuits, sites, WAN edges, and other resources and configurations for the network.

Figure 4:
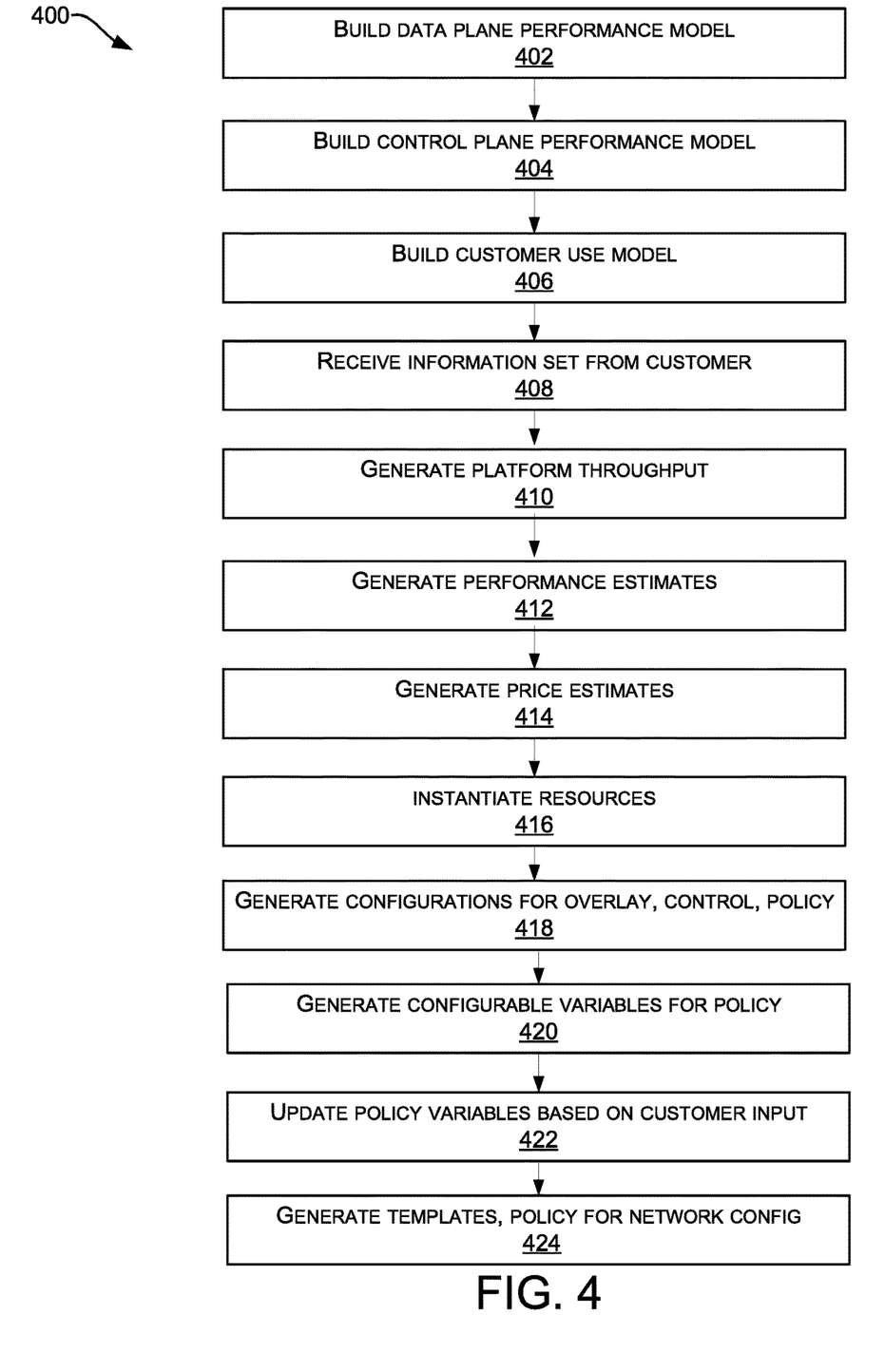
FIG. 4 illustrates a flow chart of a process for designing a network to be provisioned in accordance with some examples.

FIG. 4 illustrates a process 400 for designing a network such as an SD-WAN (e.g., the enterprise network 100) using the system 400.

At block 402, the process 400 includes building a data plane throughput performance model. In some examples, a comprehensive and initial data plane throughput performance model can be built using the data plane throughput performance model 302 with input data plane parameters 302A such as platform type, feature set, packet size, software version, etc. In some examples, resource allocation between a data plane and a control plane of the network may be based on the software version used. In some examples, building the data plane throughput performance model 302 based on the above data plane parameters 302A can include performing multiple linear regressions on these parameters. In some examples, manual adjustments are possible, e.g., when non-linear relationships may exist between parameters such as the packet size and feature set.

At block 404, the process 400 includes building a control plane throughput performance model. In some examples, the control plane throughput performance model 304 can be used to build a comprehensive and initial control plane throughput performance model based on the parameters 302B which can include platform type, feature set, packet size, software version, etc. In addition to or in lieu of platform type, the cloud environment or virtual machine size may also be used as parameters for designing the control plane throughput performance model. In some examples, resource allocation between a data plane and a control plane of the network may be based on the software version used. In some examples, building control plane throughput performance model 304 based on the above parameters 302B can include performing multiple linear regressions on these parameters.

At block 406, the process 400 includes building a model of customer use for the network infrastructure being designed. In some examples, the customer use model 306 can be used to model customer use by mapping a business vertical (e.g., whether the business may relate to healthcare, banking, e-commerce, etc.) to one or more of an average mix of packet size, a common feature set for different applications, variance in bandwidth usage (e.g., height of bandwidth peaks), etc. In some examples, the customer use model 306 can be built using exploratory clustering algorithms (e.g., Support Vector Machine (SVM)) to intelligently define the business vertical based on one or more of the above values. In some examples, the customer use model 306 can identify or highlight differences in resource consumption or usage for different business verticals. In some examples, clusters in the values can be identified and the clusters can be interpreted and presented as configurable options such that a customer may select the options best suited for the business needs or intent.

At block 408, the process 400 includes receiving a information from the customer which may be used in further defining the customer use model. In some examples, the factors 306A can include the information from the customer. The information can include a minimal information set which can provide an indication of the customer's intent according to aspects of this disclosure. In some examples, the minimal information set can include one or more of the following: network size in terms of a number and type of circuits the customer intends to implement, the nature of the network sites (e.g., sites such as data centers can include a mix of private and public circuits); a network topology for the sites (e.g., full-mesh, hub-spoke, hybrid, etc.); and an estimated total bandwidth usage for each network site. In some examples, the factors 306A can include the information set and the business verticals discussed in the block 406.

At block 410, the process 400 includes generating options for data plane platforms. In some examples, the data plane provisioning model 310 can be used to determine the platform throughput 310B for the data plane based on the data plane throughput scale 302B from the data plane throughput performance model 302 and the use cases 306B from the customer use model 306. In some examples, the options provided by the platform throughput 310B may be presented in the form of suggestions or recommendations to help the customer choose a data plane platform. The suggestions or recommendations can also be based on a weighted function that optimizes for one or more of price, inventory (e.g., availability of application programming interfaces (APIs)), configured reliability (e.g., 25% headroom, 50% headroom, or 100% headroom), and estimated ping latency from one location to another (e.g., in the case of virtual machines used in the network deployment).

At block 412, the process 400 includes generating performance estimates for the control plane. In some examples, control plane provisioning model 312 can be configured to determine the performance 312B for the control plane. The performance 312B can correspond to expected performance for all clouds/virtual machines to be implemented in the network, for example. The performance 312B can be determined by the control plane provisioning model 312 based on the control plane scale 304B from the control plane throughput performance model 304 and the use cases 306B from the customer use model 306. In some examples, the performance 312B may be provided as suggestions for provisioning the network. In some examples, the generated values can also be based on cost or price considerations, expected reliability (e.g., 25% headroom, 50% headroom, or 100% headroom), bidirectional forwarding (BFD) scale, etc. For example, the customer model can include configurations for a cloud hosting infrastructure, an expected price, and an estimated ping latency from one site to another site.

At block 414, the process 400 includes generating price estimates for the network to be provisioned. The price estimates can be based on the customer input received in the block 408 (e.g., the control plane redundancy, cloud location, and network size) and the suggested platform in the block 410. In some examples, the price may be generated as a quote or presented as an estimate based on available pricing information for one or more of a combination of inventory APIs, static pricing tables, public cloud hosting pricing information, etc.

At block 416, the process 400 includes spinning up or instantiating resources such as the relevant virtual machines for the network deployment at the different sites. In some examples, the virtual machines instantiated can be agnostic of the virtual machine monitor or hypervisor which may be utilized.

At block 418, the process 400 includes generating network configurations. In some examples, the configurations may include specifications for overlay, control, and data policy determined from the aforementioned blocks. For example, the network topology information, the site definitions, and feature set received as the customer input in the block 406 can be used to generate the network configurations. The control redundancy can be minimized or optimized at this stage for the generated network configurations (noting that in contrast, the conventional sizing tools may operate on perceived scale or redundancy, which may lead to over-provisioning the resources as mentioned previously). In some examples, policy representation can also be optimized (e.g., to eliminate extraneous or duplicate sequences). In some examples, features such as deep packet inspection (DPI) and/or other computationally intensive features can be selectively enabled for certain branches of the network, rather than for the entire data center.

At block 420, the process 400 includes generating configurable variables for policy. For example, the customer may be presented with network policy (e.g., in the form of string names, tables, or spreadsheets which can be modified according to the customer's preferences).

At block 422, the process 400 includes receiving the customer's input and any modifications to the policy (e.g., in response to the policy being generated and presented to the customer in the block 420). The policy can be updated accordingly (e.g., by modifying the spreadsheet). The updated policy may be presented to the customer and finalized over one or more such iterations.

At block 424, the process 400 includes generating templates for the approved policy for network configuration. The approved policy can then be used for the network provisioning and configuration. In this manner, a customer-intent based network provisioning can be accomplished according to example aspects. In some examples of the process 400, the complex multivariate interactions between hardware flavor, feature set, and industry traffic characteristics are optimized as discussed above. Further, a set of business verticals can be defined (e.g., in the block 404) before usage patterns are investigated, which allows using models such as the SVM to cluster usage based on enabled feature set, total bandwidth usage, and mix of packet sizes. Based on studying the clustering patterns, it is also possible to generate predictions for relevant business categories.

Figure 5:
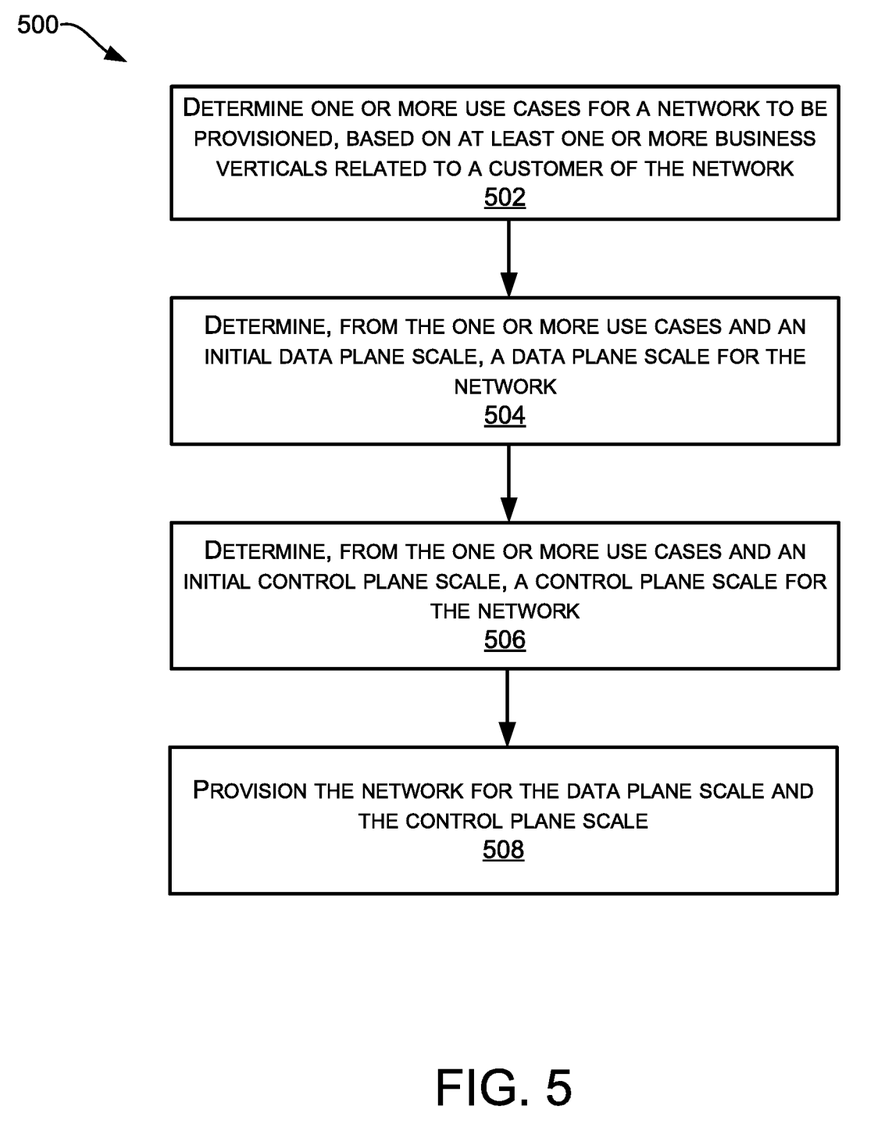
FIG. 5 illustrates an example method for provisioning a network in accordance with some examples.

Having described example systems and concepts, the disclosure now turns to the process 500 illustrated in FIG. 5. The steps or blocks outlined herein are examples and can be implemented in any combination thereof, including combinations that exclude, add, or modify certain steps.

At block 502, the process 500 can include determining one or more use cases for a network to be provisioned, based on at least one or more business verticals related to a customer of the network. For example, the one or more use cases 306B can be generated by the customer use model 306 by mapping the one or more business verticals to one or more of factors related to the network 100. In some examples, the one or more factors can include one or more of an average mix of packet size, a common feature set, or a variance in bandwidth. In some examples, the mapping performed by the customer use model 306 can be based on clustering algorithms on the one or more factors to determine clusters related to the use cases. In some examples, the one or more use cases 306B can also be based on information received from the customer, where the information can include one or more of a number and type of circuits available for the network, a topology of the network, or an estimated total bandwidth usage for each site of the network.

At block 504, the process 500 can include determining, from the one or more use cases and an initial data plane scale, a data plane scale for the network. For example, the data plane scale such as the platform throughput 310B can be determined by the data plane provisioning model 310 based on the use cases 306B and the initial data plane scale such as the data plane scale 302B. In some examples, the data plane scale 302B can be generated by the data plane throughput performance model 302 by performing a linear regression on one or more data plane parameters 302A of the network, where the one or more data plane parameters 302A can include one or more of a platform type, feature set, packet size, or software version of the network. In some examples, the data plane scale can include one or more of a price, inventory, or configured reliability for the data plane of the network.

At block 506, the process 500 can include determining, from the one or more use cases and an initial control plane scale, a control plane scale for the network. For example, the control plane scale such as the performance 312B can be determined by the control plane provisioning model 312 based on the use cases 306B and the initial control plane scale such as the control plane scale 304B. In some examples, the control plane scale 304B can be determined by the control plane throughput performance model 304 by performing a linear regression on one or more control plane parameters 304A of the network, where the one or more control plane parameters 304A can include one or more of a platform type, feature set, or software version of the network. In some examples, the control plane scale can include one or more of a price, performance, or configured reliability for the control plane of the network.

At block 508, the process 500 can include provisioning the network for the data plane scale and the control plane scale.

Figure 6:
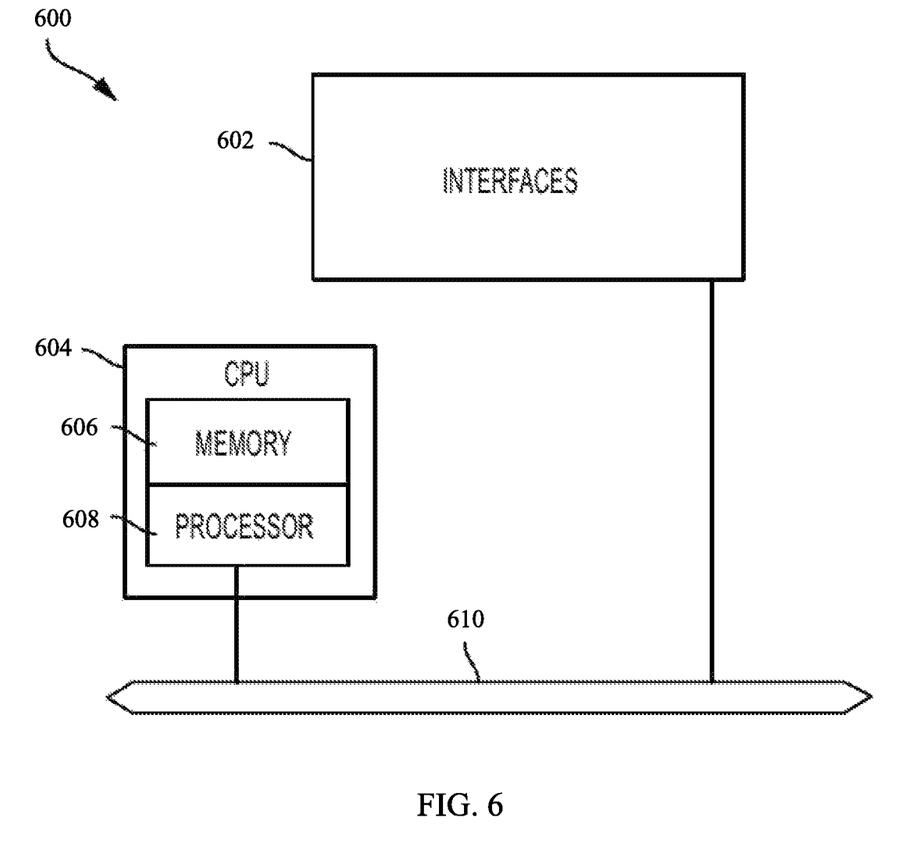
FIG. 6 illustrates an example network device in accordance with various examples.

FIG. 6 illustrates an example network device 600 suitable for designing a network to be provisioned according to this disclosure. Network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
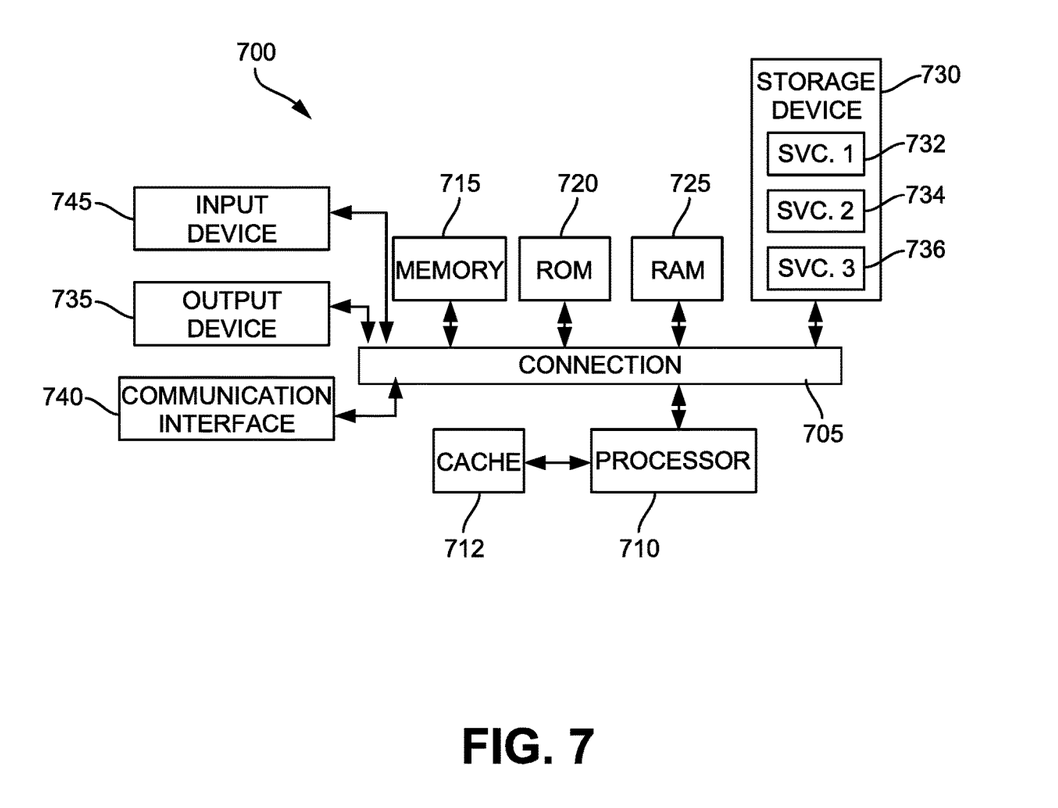
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   prior to provisioning a network, determining one or more use cases for the network, the one or more use cases being determined based on at least one or more business verticals related to a customer of the network;
prior to provisioning the network, generating an initial data plane scale based on a linear regression performed on one or more data plane parameters comprising at least one of a network platform type, a packet size, and a software version associated with the network;
prior to provisioning the network, generating an initial control plane scale based on a linear regression performed on one or more control plane parameters comprising at least one of a network platform throughput, a cloud environment size, and a software version associated with the network;
prior to provisioning the network, determining, from the one or more use cases and the initial data plane scale, a data plane scale for the network;
prior to provisioning the network, determining, from the one or more use cases and the initial control plane scale, a control plane scale for the network;
generating a network design for the network based on the data plane scale and the control plane scale; and
provisioning the network according to the network design.

2. The method of claim 1, wherein the one or more data plane parameters further comprise a feature set.

3. The method of claim 1, wherein the one or more control plane parameters further comprise a virtual machine size.

4. The method of claim 1, wherein determining the one or more use cases based at least on the one or more business verticals comprises mapping the one or more business verticals to one or more of factors related to the network, the one or more factors comprising one or more of an average mix of packet size, a common feature set, or a variance in bandwidth.

5. The method claim 4, wherein the mapping comprises clustering algorithms on the one or more factors to determine clusters related to the use cases.

6. The method of claim 1, further comprising determining the one or more use cases from information received from the customer, the information comprising one or more of a number and type of circuits available for the network, a topology of the network, or an estimated total bandwidth usage for each site of the network.

7. The method of claim 1, wherein the data plane scale comprises one or more of a price, inventory, or configured reliability for the data plane of the network, and wherein the control plane scale comprises one or more of a price, performance, or configured reliability for the control plane of the network.

8. The method of claim 1, wherein generating a network design for the network comprises determining a configuration and platform of resources to be provisioned when deploying the network.

9. A system comprising:
one or more processors; and
at least one computer-readable storage medium having stored therein instructions which, when executed by the one or more processors, cause the one or more processors to:
determine, prior to provisioning a network, one or more use cases for the network, the one or more use cases being determined based on at least one or more business verticals related to a customer of the network;
prior to provisioning the network, generate an initial data plane scale based on a linear regression performed on one or more data plane parameters comprising at least one of a network platform type, a packet size, and a software version associated with the network;
prior to provisioning the network, generate an initial control plane scale based on a linear regression performed on one or more control plane parameters comprising at least one of a network platform throughput, a cloud environment size, and a software version associated with the network;
determine, prior to provisioning the network, from the one or more use cases and the initial data plane scale, a data plane scale for the network;
determine, prior to provisioning the network, from the one or more use cases and the initial control plane scale, a control plane scale for the network;
generate a network design for the network based on the data plane scale and the control plane scale; and
provision the network according to the network design.

10. The system of claim 9, wherein the one or more data plane parameters further comprise a feature set.

11. The system of claim 9, wherein the one or more control plane parameters further comprise a virtual machine size.

12. The system of claim 9, wherein determining the one or more use cases based at least on the one or more business verticals comprises mapping the one or more business verticals to one or more of factors related to the network, the one or more factors comprising one or more of an average mix of packet size, a common feature set, or a variance in bandwidth.

13. The system of claim 12, wherein the mapping comprises clustering algorithms on the one or more factors to determine clusters related to the use cases.

14. The system of claim 9, wherein the at least one computer-readable storage medium comprises additional instructions which, when executed by the one or more processors, cause the system to:
determine the one or more use cases from information received from the customer, the information comprising one or more of a number and type of circuits available for the network, a topology of the network, or an estimated total bandwidth usage for each site of the network.

15. The system of claim 9, wherein the data plane scale comprises one or more of a price, inventory, or configured reliability for the data plane of the network, and wherein the control plane scale comprises one or more of a price, performance, or configured reliability for the control plane of the network.

16. The system of claim 9, wherein generating a network design for the network comprises determining a configuration and platform of resources to be provisioned when deploying the network.

17. A non-transitory computer-readable storage medium comprising:
instructions stored therein instructions which, when executed by one or more processors, cause the one or more processors to:
determine, prior to provisioning a network, one or more use cases for the network, the one or more use cases being determined based on at least one or more business verticals related to a customer of the network;
prior to provisioning the network, generate an initial data plane scale based on a linear regression performed on one or more data plane parameters comprising at least one of a network platform type, a packet size, and a software version associated with the network;

prior to provisioning the network, generate an initial control plane scale based on a linear regression performed on one or more control plane parameters comprising at least one of a network platform throughput, a cloud environment size, and a software version associated with the network;

determine, prior to provisioning the network, from the one or more use cases and the initial data plane scale, a data plane scale for the network;

determine, prior to provisioning the network, from the one or more use cases and the initial control plane scale, a control plane scale for the network;

generate a network design for the network based on the data plane scale and the control plane scale; and provision the network according to the network design.

18. The non-transitory computer-readable storage medium of claim 17, wherein the one or more data plane parameters further comprise a feature set.

19. The non-transitory computer-readable storage medium of claim 17, wherein the one or more control plane parameters further comprise a virtual machine size.

20. The non-transitory computer-readable storage medium of claim 19, wherein generating a network design for the network comprises determining a configuration and platform of resources to be provisioned when deploying.

* * * * *